United States Patent [19]
Levin et al.

[11] 3,898,427

[45] Aug. 5, 1975

[54] FLEXIBLE WARMING STRUCTURE

[75] Inventors: Berton P. Levin, Santa Monica; Darrell D. Stoddard, Malibu, both of Calif.

[73] Assignee: The Sierracin Corporation, Sylmar, Calif.

[22] Filed: July 1, 1974

[21] Appl. No.: 484,406

Related U.S. Application Data

[60] Continuation-in-part of Ser. No. 375,673, June 29, 1973, abandoned, which is a continuation-in-part of Ser. No. 188,312, Oct. 12, 1971, and a continuation-in-part of Ser. No. 363,385, May 24, 1973, abandoned, which is a division of Ser. No. 188,312, Oct. 12, 1971, abandoned.

[52] U.S. Cl. ............... 219/522; 117/211; 161/45; 219/203; 219/528; 219/543; 219/549; 338/211
[51] Int. Cl. ............................................. H05b 3/34
[58] Field of Search ......... 29/611; 117/211; 161/45, 161/165; 219/203, 385, 522, 527, 528, 543, 549; 338/211, 212, 308, 309

[56] References Cited
UNITED STATES PATENTS

| | | | |
|---|---|---|---|
| 2,739,083 | 3/1956 | Brown, Jr. et al. ................. | 117/211 |
| 3,020,376 | 2/1962 | Hofmann et al. ................ | 219/203 X |
| 3,180,781 | 4/1965 | Ryan et al. ........................... | 165/45 |
| 3,288,983 | 11/1966 | Lear, Sr. .............................. | 219/522 |
| 3,299,253 | 1/1967 | Lawson, Jr. .......................... | 219/385 |
| 3,330,942 | 7/1967 | Whitson............................... | 219/522 |
| 3,514,581 | 5/1970 | Rocholl et al. ...................... | 219/522 |
| 3,529,074 | 9/1970 | Lewis............................... | 219/522 X |
| 3,718,535 | 2/1973 | Armstrong et al.................. | 161/165 |

Primary Examiner—Volodymyr Y. Mayewsky
Attorney, Agent, or Firm—Christie, Parker & Hale

[57] ABSTRACT

A transparent flexible warming structure particularly useful as a medical accessory such as an incubator or other individual patient warming structure is described herein. The structure comprises a pair of flexible transparent plastic sheets having an electrically conductive transparent heater layer over substantially the entire extent thereof sandwiched between the plastic sheets. A metal strip is electrically and mechanically connected to the heater layer along side edges so that passage of an electric current therebetween causes heating over the entire transparent flexible structure. In some embodiments, the transparent sheet structure is placed in a rigid frame substantially the same size as the periphery of the heater. In other embodiments, the flexible sheet is arched between a pair of rigid rails which provide mechanical and electrical contacts.

21 Claims, 8 Drawing Figures

PATENTED AUG 5 1975 3,898,427

SHEET 2

FLEXIBLE WARMING STRUCTURE

CROSS-REFERENCE TO RELATED APPLICATION

This is a continuation-in-part of U.S. patent application Ser. No. 375,673, filed June 29, 1973, now abandoned, which is a continuation-in-part of U.S. patent application Ser. No. 188,312, filed Oct. 12, 1971; and a continuation-in-part of U.S. patent application Ser. No. 363,385 filed May 24, 1973, now abandoned, which is a division of said U.S. patent application Ser. No. 188,312.

BACKGROUND

There are many situations in hospitals where it is desirable to maintain the temperature of a patient's surroundings above the usual ambient, such as, for example, at nearly body temperature. This often occurs, for example, with newborn infants, particularly premature infants, and commonly such infants are maintained in an incubator for complete environmental control. In most incubators a transparent plastic or glass cover is used, and the temperature is maintained by circulation of warm air.

U.S. Pat. No. 3,299,253 by W. H. Lawson, Jr., provides a baby incubator having a transparent cover having an electrical heating layer embedded therein so that the infant is warmed by gentle irradiation. By providing such a transparent cover there is no obstruction to continual observation of the infant so that one can observe any changes in its condition. The transparent cover provided in the aforementioned patient is preferably made of transparent polyester plastics bonded together with polyvinyl butyral with a transparent vacuum deposited layer of conductive material sandwiched between the plastic layers. To obtain sufficiently high optical quality in the incubator cover, expensive tooling is required for precisely bending the plastic layers without optical distortion. The manufacturing tenchique involves vacuum metallizing of a flat plastic sheet, bonding of the second sheet to it, and then heating and pressing on rigid tooling to form the plastic sheets to the desired shape. A portion of the cost of such a structure is attributable to the batch metallizing needed for rigid sheets.

Another application of a transparent warming structure is in care of severe burn patients who often lose the ability to maintain body temperature control. The severely burned person needs to be kept warm and yet should be free of any covering. It is also highly desirable that the burn be observable continually without removing any coverings. Other similar situations arise with some severe wounds and with allergic persons who need to be kept warm without contact with coverings.

A transparent warming structure for such a person must be appreciably larger than the aforementioned baby incubator, and the costs of tooling for forming an optically acceptable enclosure are significantly magnified, as are the problems of obtaining uniform vacuum metallizing of a larger sheet. Optical transparency and freedom from distortion is desirable, not only to permit observation by medical personnel and vistors, but also to alleviate the psychological effect of the patient being in an enclosure, and also to permit observation of television and the like by the patient.

Although such transparent warming structures are highly desirable, they have significant drawbacks in addition to high cost. The plastic covers are susceptible to scratching and other marring, as well as chemical attack, so that their useful life may be limited in practical hospital situations. When a sufficient amount of chemical attack and scratching has occurred, the optical quality is diminished to the point that the structure needs to be discarded and replaced with consequent high cost. The transparent structures are heavy, particularly one large enough for an adult patient, and are therefore difficult to handle in a hospital situation. Another disadvantage can arise where close and rapid temperature control is required, since the massive structure has a high termal inertia so that its temperature cannot be changed rapidly. Also electricl failure, e.g., due to burn out, renders the entire assembly useless, necessitating replacement of this cost by heater.

Flexible warming structures which do not contact the patient have been devised in the form of "tents" made of fabric to which metal wires are attached to provide radiant heating, somewhat in the manner of an electric blanket on a frame. Such tents require framework supports to which the fabric is tailored and are also opaque so that to observe the patient it is necessary to remove at least a portion of the covering.

It is, therefore, desirable to provide a body warming apparatus having a flexible transparent warming structure that is sufficiently inexpensive that it can be readily replaced, is lightweight, and has fast thermal response and high optical quality.

BRIEF SUMMARY OF THE INVENTION

Therefore, there is provided in practice of this invention according to a presently preferred embodiment a transparent, flexible warming structure having a pair of flexible transparent plastic sheets bonded together with an electrically conductive transparent heater layer over substantially the entire area thereof sandwiched between the two sheets. A high conductivity strip electrically and mechanically bonded to the heater layer along the side edges of the plastic sheets provides electrical contact. The entire structure is sufficiently thin to be flexible and readily bent by hand.

DRAWINGS

These and other features and advantages of this invention will be appreciated as the same becomes better understood by reference to the following detailed description of a presently preferred embodiment when considered in connection with the accompanying drawings wherein:

FIG. 3 illustrates semi-schematically a transparent flexible warming structure for connection to a bed or the like;

DESCRIPTION

Figure 1:
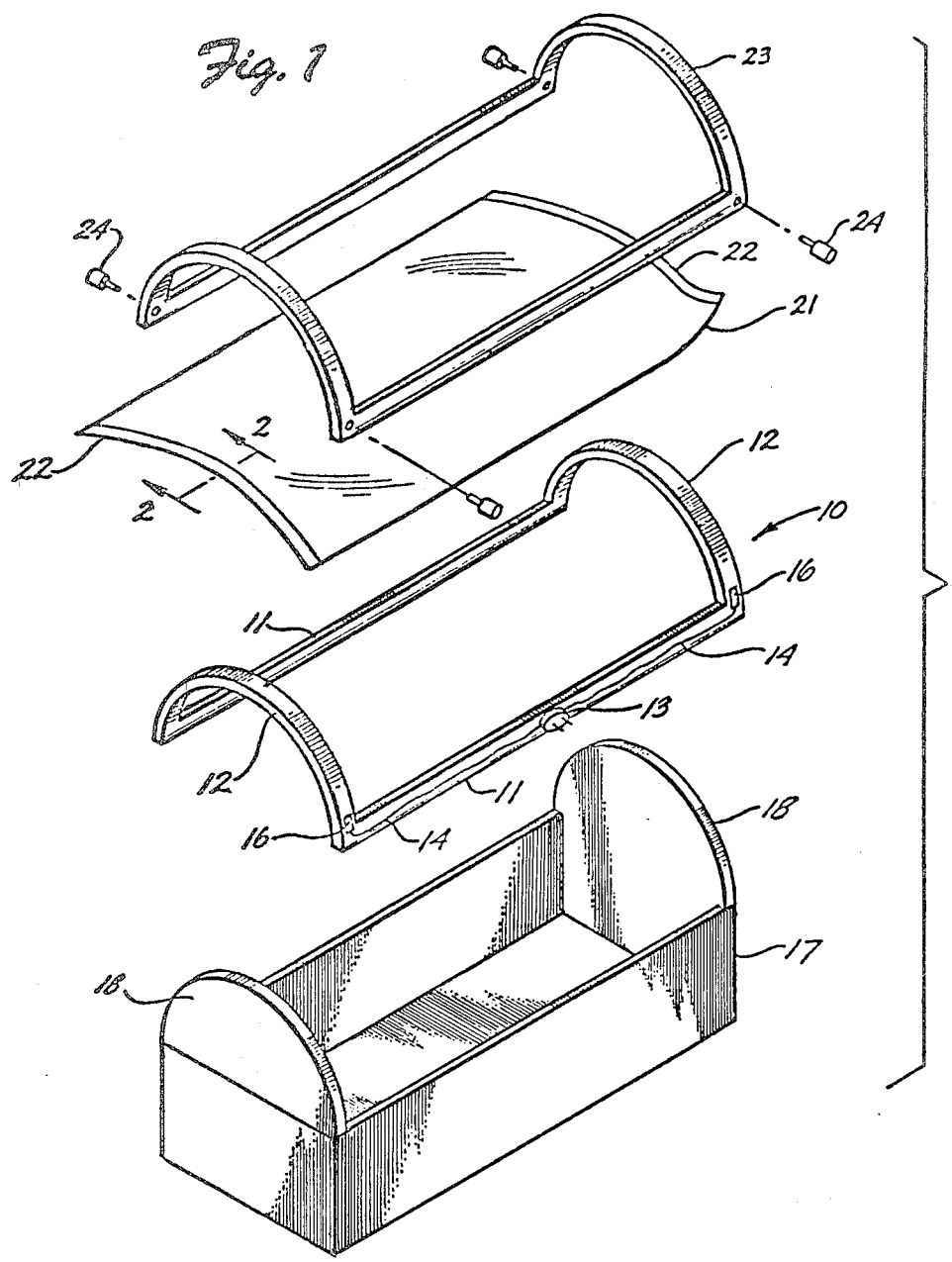
FIG. 1 illustrates in exploded perspective a body warming structure constructed according to principles of this invention.

FIG. 1 illustrates in exploded perspective a flexible, transparent warming structure constructed according to principles of this invention. As illustrated in this presently preferred embodiment, there is a rigid frame 10 having a pair of straight side edges 11 and arched ends 12 interconnecting the side edges. The center portion of the frame is open. Such a frame can be formed of metal or preferably is injection molded or assembled of high impact resistant plastic so as to be an electrical insulator. It will be recognized that the frame 10 is illustrated in relatively simple form and that if desired additional stiffening ribs, handles, or the like may be used as desired.

On one side edge 11 a conventional male plug 13 is provided for making electrical connection to a conventional power supply (not shown) the output of which may be controlled in a conventional manner. Wires 14 lead from the plug 13 to a pair of metal contact pads 16 at the corners of the frame. The frame 10 is set on or mounted in any conventional manner to an incubator bed 17, which is illustrated only schematically as a box and will be understood to be any conventional incubator. The frame may be held onto the incubator bed 17 by clips or fit into brackets, or can be hinged along one side edge 11 so that it can be raised and lowered as desired. An arcuate end piece 18 is mounted on the incubator bed for closing the end of the arcuate frame. Such an end closure can be secured to the frame, or the ends can be left open as may be desired.

A transparent, flexible plastic warming element 21, hereinafter described in greater detail, is laid over the frame 10 so as to conform thereto. The flexible, transparent sheet 21 is substantially coextensive with the frame so that the side edges of the sheet overlap the edges and ends of the frame. Along each edge of the sheet 21 that lies on the ends of 12 of the frame there is a metal "bus bar" 22, which is in practice a copper strip sufficiently thin to be flexible. The bus bar 22 is on the downward face of the sheet 21 so that when the sheet is placed over the frame 10 the two bus bars 22 at the ends are in contact with the metal contact pads 16 at the corners of the frame. In this way, electrical contact is made between the plug 13 and the bus bars 22.

A second substantially rigid frame 23 complementary to the frame 10 fits over the flexible sheet heater 21 for providing additional rigidity and holding the sheet in place. Typically bolts 24 are used to secure the two frames 10 and 23 together during use of the incubator.

Figure 2:
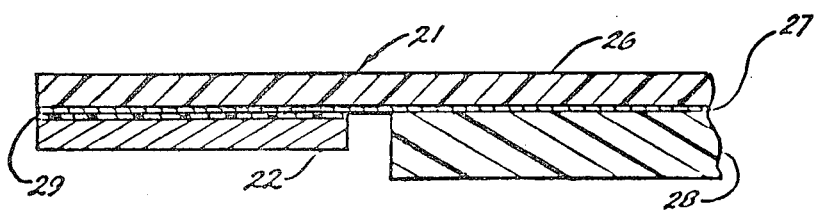
FIG. 2 illustrates in cross section an edge of a flexible element of the structure of FIG. 1.

An edge of the transparent, flexible heater 21 is seen in cross section in FIG. 2. As illustrated in this embodiment the heater comprises an outer plastic sheet 26 which in a typical embodiment is a sheet of polyethylene terephthalate about 5 mils thick. A conductive layer 27, such as gold, silver, copper, iron or nickel is deposited on the sheet 26 substantially throughout its extent. Such deposition is typically by vacuum metallizing according to conventional practice with a metal thickness sufficiently low that it is transparent.

A second plastic sheet 28 is bonded to the metal layer 27 so that the metal layer is between the two plastic sheets 26 and 28. Typically, this second plastic sheet which would be located on the inside of the incubator is also polyethylene terephthalate about 10 mils thick. The second sheet 28 is narrower than the outer sheet 26 so that a clear space is left along each of the pair of side edges that lie at the ends 12 of the frame (FIG. 1). The copper bus bar 22 extends along this exposed side edge and is bonded to the metallized heater layer by a conventional conductive adhesive 29. The bus bar 22 has a much higher electrical conductivity than the metal layer 27 (the thickness of which is exaggerated in FIG. 2 for purposes of illustration) so that uniform electrical contact is made along each side edge of the heater. If desired, the inner plastic sheet 28 may overlap the bus bar 22 over a portion of its extent for providing electrical insulation thereof or some mechanical support. At least a portion of the bus bar must be left free for making electrical contact with the metal contact pads 16 or similar conductive elements. Thus, for example, the entire bus bar may be covered by the inner sheet except for a small area left at one corner for electrical contact. Such construction minimizes electrical hazards.

The plastic sheets 26 and 28 are preferably polyethylene terephthalate such as commercially available under a variety of trade marks such as Mylar, Scotchpar, and Celanar. Alternatively, the plastic sheets may be a high temperature polyamide resin, such as nylon 6 or nylon 12. Another suitable plastic sheet is polytetramethylene terephthalate. Although these materials are preferred for the plastic sheets used in making the transparent flexible warming structure of this invention, other suitable transparent synthetic resins can be selected from the group consisting of polycarbonate resin, polyimide resin, fluorinated ethylene-propylene resin, polyester resin, polyacrylic resin, and cellulose triacetate resin, so long as at least one of the sheets selected for the structure has a sufficiently low vapor pressure to be vacuum metallizable and the plastics have a heat deformation of less than about 1 percent in any direction at a temperature up to about 150°F. Unless the sheets have less than this heat deformation, dimensional and electrical changes may occur that are unacceptable in a commercial embodiment. The plastics should also be substantially transparent over much of the visible spectrum and are preferably largely opaque in bulk in the infrared region. The aforementioned suitable plastics have elastic moduli in the range of about $1.8 \times 10^5$ to $4.5 \times 10^5$ psi (Modern Plastics Encyclopedia) so that the thin laminates have appreciable flexibility.

It is prefered that the plastics be selected with a suitable composition and thickness so that they are substantially opaque to infrared radiation in the range of wavelength of about 2 to 20 microns. With such properties the heater sheet has a high infrared emittance and can deliver heat in effective rates with a lower operating temperature than would be the case if it were more transparent to infrared. This means that the entire flexible warming structure can be operated at a sufficiently low temperature that it is completely safe to personnel, while at the same time delivering sufficient heat to maintain at a desired temperature a body irradiated by the flexible warming structure.

Polyethylene terephthalate and the polyamide resins hereinabove mentioned are particularly preferred because of their high temperature resistance, resistance to most chemical attack, good hardness, freedom from plasticizers that would interfere with vacuum metallizing, and excellent optical quality. It is also preferred that the outer sheet 26 have a thickness no more than about 5 mils (0.005 inch) and that the inner sheet 28 have a thickness in the order of 7 to 10 mils or more. This arrangement provides a desired balance of economy of production and mechanical protection of the conductive coating by the outer sheet and relatively low infrared emittance from the outer sheet. The thicker inner sheet assures adequate strength of the assembly and a relatively high infrared emittance from the inner sheet in the wavelength range of about 2 to 20 microns. When lower stiffness is feasible, a preferred arrangement has both plastic sheets of equal thickness, for example, 5 mils for ease and economy of manufacture.

If a higher stiffness is desired, the plastic sheets making up the flexible transparent heater element can be somewhat thicker. Satisfactory structures have been made with a total thickness of about 30 mils. As thicknesses become larger the stiffness of the flexible heater element increases and the available radius of curvature decreases. It is important, however, that the transparent heater element remain flexible so that it can be readily made and transported and applied to various supporting structures without preforming to a desired curvature. Such preforming is expensive and has been found to be avoidable in practice of this invention.

A flexible sheet as contemplated in practice of this invention lies flat or substantially flat under its own weight when laid on an ordinary flat surface. The transparent heater element is sufficiently flexible, however, so that when laid over a curved structure it sags into substantial curvature under its own weight and if need be sharper curvature can be obtained by only slight additional force. Such flexible heater elements can for example be rolled up for storage or shipment, or maintained flat as may be desired. Typically plastic sheets up to almost 100 mils thick have sufficient flexibility to be used in many embodiments of this invention. Somewhat thinner sheets are required if a high degree of curvature is desirable. Such a sheet would normally lie flat on a flat surace and bend to a substantial degree of curvature in either direction when laid over a curved surface or nonflat support. This is to be contrasted with a rigid structure made of glass or thick plates of plastic as have been employed in the past.

The flexible transparent heater element is readily manufactured at low cost since it can be made substantially continuously in a vacuum metallizing operation with conventional techniques. Thus, for example, the outer sheet 26 is provided in large rolls which can be unreeled continuously and passed through a deposition region in a vacuum metallizing chamber and coiled up again. Typically the mating surfaces of the plastic sheets ae primed with a conventional silane primer and the sheets bonded together with a conventional silicone adhesive. A variety of other adhesive systems may be employed, as will be apparent to one skilled in the art. The priming, adhesive coating, and bonding steps can be carried on continuously with long sheets of the plastics. Similarly, the adhesive 29 and the bus bar 22, which is typically a thin copper ribbon, can be applied along each edge of the roll of plastic in a continuous operation. Rolls of flexible transparent heater with integral bus bars are thus made in continuous conventional processes at extremely low cost as compared with the batch type processing of prior rigid transparent heaters. In order to make individual heaters of these rolls, it is only necessary to cut the sheet to appropriate lengths.

In the above described embodiment the flexible transparent heater sheet is about 15 mils thick and, hence, has some degree of elasticity. This stiffness of the sheet is sufficient that the sheet is well supported in its central portion when fitted within the frame 10 illustrated in FIG. 1. It will also be apparent, of course, that a greater degree of stiffness can be provided by making one or both of the plastic sheets somewhat thicker, and greater flexibility can be obtained by making both of the sheets somewhat thinner. It is generally preferred that the total thickness of the sandwich of two plastic sheets be no less than about 10 mils in order to retain a relatively high strength and infrared emittance. Otherwise the flexible heater sheet must be heated to a higher temperature to get a desired heat flux.

Because of the thinness of the flexible transparent heater sheet, it is highly advantageous as a flexible warming structure. It is light in weight so as to be easy and safe to handle in a hospital or other situation. Being flexible, a substantial number of such sheets may be stored merely by stacking them in lat layers, and they are bent as required to fit the incubator frames. Because of the low mass of the flexible transparent sheet, the thermal inertia is very small and the sheet is rapidly responsive to changes in heating demand. Thinness also assures excellent optical quality and minimum distortion since the sheets are of consistently uniform thickness and, even when viewed at an angle, no substantial optical distortion is encountered.

Since the flexible transparent heater sheet is made in continuous processes, its cost is extremely low as compared prior rigid structures. Because of this, if scratching or other mechanical damage to the heater sheet occurs, the entire sheet can be discarded and replaced relatively economically. In a prior rigid structure, the high cost inhibits discarding the structure and it may be used for a substantial period after the optical quality has deteriorated significantly.

If desired, holes can be placed through the transparent flexible heater sheet, which may be particularly advantageous where it is desired to pass a tube or the like through the sheet. Thus, for example, if intravenous fluids are delivered to a burn patient, the tubes may be passed through an aperture in the sheet without significantly disturbing the temperature distribution.

Figure 5:
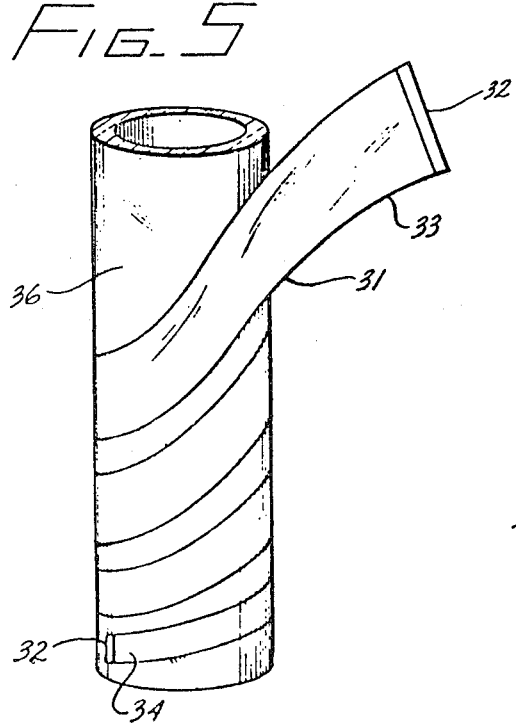
FIG. 5 illustrates another embodiment of flexible warming structure for nonuniform heating of a column.

Another advantage of the thin, flexible, transparent heater sheet is that it can be readily cut to provide a variety of desired shapes for nonuniform temperature distribution. Thus, for example, in the embodiment illustrated in FIG. 5 there is provided a flexible warming sheet 31 similar to the metal and plastic sandwich hereinabove described and illustrated in FIG. 2. The sheet 31 is in the form of a long strip having a flexible bus bar 32 at each end thereof. The bus bars may be copper strips as hereinabove described or, if desired, can be flexible braid of wire cemented to the conductive heater layer in the sheet 31.

The width of the heater strip 31 is greater near one end 33 than it is at the other end 34. The same current flows through all portions of the flexible transparent sheet at all cross sections between the two bus bars 32. Since the strip is narrower near one end 34, the current density in the conductive layer is greater than the current density at the wider end 33. The heat generated in the strip is therefore greater at the narrow end than at the wide end.

In a typical application, the strip 31 is wound in a generally helical path around a glass tube 36 within which it is desired to maintain a nonuniform temperature. Because of the nonuniform width of the strip 31 the temperature at the lower end of the tube illustrated in FIG. 5 will be higher than the temperature at the upper end.

Figure 6:
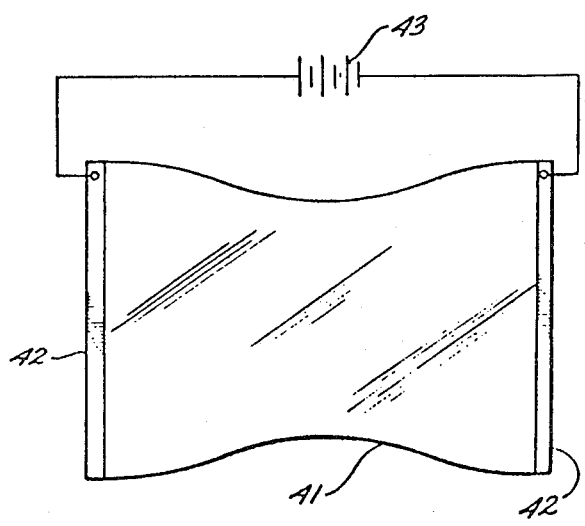
FIG. 6 illustrates another flexible transparent warming structure for nonuniform heating.

FIG. 6 illustrated another embodiment of flexible heater constructed according to principles of this invention. As illustrated in this embodiment the plastic sheet 41 has flexible bus bars 42 along each of a pair of side edges. A power supply 43, illustrated schematically in FIG. 6, may be connected across the bus bars 42 so as to pass a current through the flexible transparent heater sheet 41. The center portion of the sheet 41 is cut narrower than the edges where the bus bars 42 are provided with a gradual transition therebetween. This assures that the current density is higher in the center portion of the sheet than near its ends and, hence, a higher temperature and greater heat dissipation can be provided in that region.

It will be apparent to one skilled in the art that other arrangements of nonrectilinear flexible transparent heater sheets can be formed as may be desired, such as, for example a trapezoidal shape wherein the bus bars are arranged along the nonparallel edges. With such an arrangement, since the resistance between the closer ends of the bus bars is less than that between the more widely spaced ends, there is a nonuniform current distribution resulting in a somewhat higher temperature where the bus bars are closer together. If desired, holes can be placed through the transparent flexible heater sheet, which may be particularly advantageous where it is desired to pass a tube or the like through the sheet. Thus, for example, if intravenous fluids are delivered to a burn patient, the tubes may be passed through an aperture in the sheet without significantly disturbing the temperature distribution.

To cut the transparent flexible heater sheet is a simple matter using any sharp cutting instrument, such as a razor blade or sharp shears. It should be emphasized that a sharp instrument should be used to avoid tiny cracks along the cut edge which may interrupt the thin metal heater layer. A sharp crack in the heater layer extending transverse to the direction of current flow causes a high localized current density which may be sufficient to damage the plastic sheets, and once such localized heating has progressed to the point of damage, the damaged area rapidly propagates across the entire sheet so that it is burned out.

A thin flexible sheet as provided in practice of this invention can be cut with a sharp knife or shears without introduction of tiny cracks in the metal layer, and it is therefore possible to provide any desired shape. With the thick, rigid transparent heaters of the prior art, such cutting is extremely difficult without introduction of tiny cracks and cannot be accomplished except in a machine shop or the like, and even there must be done with great care. Low replacement cost of the thin flexible sheet heater makes use for a broad variety of applications feasible as compared with prior heavy, expensive structures.

Figure 3:
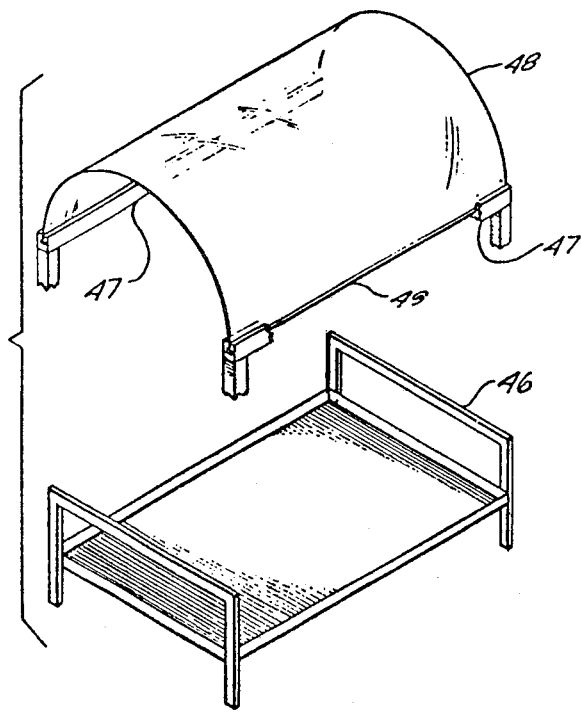

FIG. 3 illustrates semi-schematically another arrangement for supporting a flexible warming structure constructed according to principles of this invention.

As illustrated in this embodiment a conventional bed 46, such as a hospital bed or the like may be fitted with a pair of side rails 47 each of which has a U-shaped cross section. A flexible, transparent warming sheet 48 has a side edge inserted into the U-shaped rail along each side, and because of the slight stiffness of the sheet it arches freely between the two side rails without support at the arched ends. The side rails may have the grooves vertical as in the illustrated embodiment or, if desired, the grooves may be partly tilted towards each other so that the arch is lower. A bus bar 49 is provided along each side edge of the sheet 48 in the portion that is inserted into the channel of the rails 47 for making electrical contact to the heater sheet. Since the rails are separate from each other and the sheet is flexible, the entire structure can be readily stored until needed and quickly installed on a bed. Since the sheet is flexible and light weight it can easily be moved or removed as required for providing assistance to a patient within the warming structure.

Figure 4:
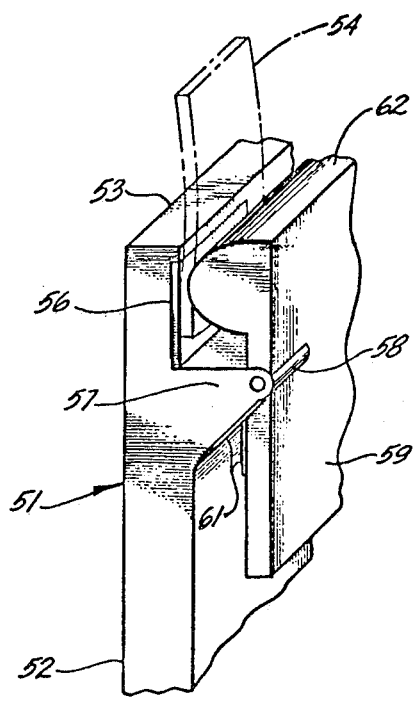
FIG. 4 illustrates a fragment of an edge clip for a flexible structure such as that illustrated in FIG. 3.

FIG. 4 illustrates an alternate arrangement of side rail for an arched warming structure such as illustrated in FIG. 3. As illustrated in this embodiment, the side rail comprises an elongated plastic strip 51 having a generally T shape. One arm 52 of the T may be connected to, or form a portion of, an incubator, for example. The other arm 53 of the T forms a rigid upstanding edge against which a transparent flexible electric heater 54, such as hereinabove described, may be placed. A metal pad 56 within the T-shaped structure provides electrical contact to the bus bar (not shown) of the flexible transparent heater.

At the bottom of the leg 57 of the T an elongated "piano" hinge 58 is formed for pivotally mounting a clip arm 59. A spring 61 between the clip arm 59 and the T-shaped member 51 biases the clip arm so that an enlarged head 62 thereon is pressed towards the upstanding arm 53 of the T-shaped member. To insert a heater element 54 in the clip-like rail, the lower portion of the clip arm 59 is pressed, thereby opening the slot between the enlarged heat 62 and the upstanding arm 53. The edge of the sheet electric heater 54 can then be inserted into the slot with the conductive bus bar (not shown) facing the electrical contact pad 56. Release of the clip arm 59 holds the plastic heater element in position and assures electrical contact between the bus bar and contact pad.

Figure 7:
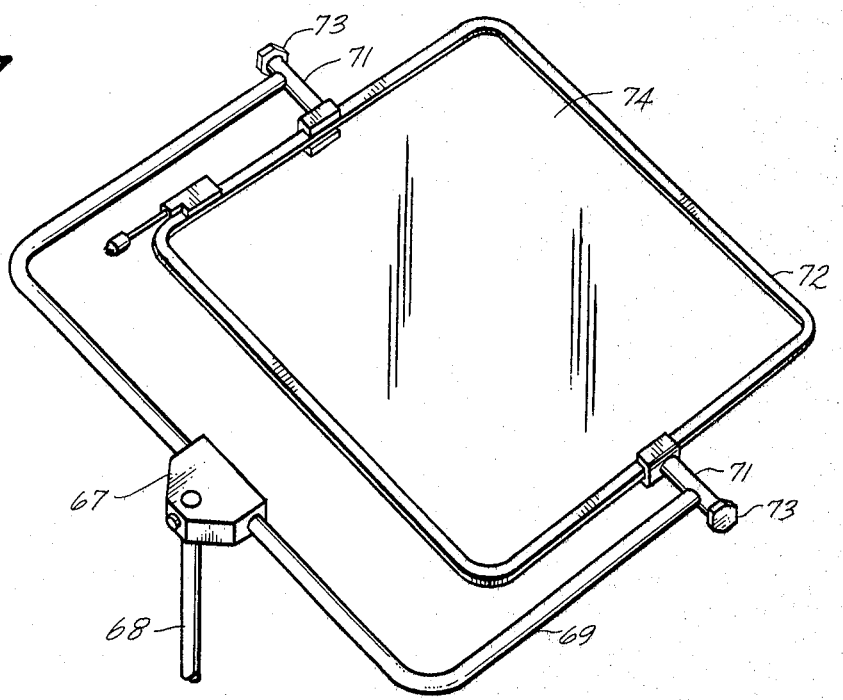
FIG. 7 illustrates another embodiment of body covering and warming apparatus.

FIG. 7 illustrates in perspective another embodiment of body warming and covering apparatus constructed according to principles of this invention. As illustrated in this arrangement the entire body warming apparatus may be supported on a stand 66, only the vertical leg of which is shown in FIG. 7. Such a stand may have any desired support arrangement on the floor such as a U-shaped base (not shown) which fits beneath a patient's bed to prevent overturning. Such a stand may also be clamped to other supporting structures such as the side of a bed or the like. A mounting block 67 is free to slide vertically on the stand 66 and can be locked in place by a screw 68 or the like. This permits the height of the warming structure to be adjusted as may be desired in a particular arrangement.

A rigid U-shaped bracket 69 extends laterally from the mounting block and terminates in a pair of spaced apart coaxial trunnions 71. A rigid frame 72 is connected between the trunnions and is free to tilt about the axis thereof. A locking bolt 73 in each trunnion can be loosened to permit tilting and tightening to inhibit tilting.

The frame 72 can be in two parts much like the arched frame illustrated in FIG. 1 so that electrical contact can be made to a flexible transparent warming sheet 74 mounted in the frame. If desired the parts of the frame can be hinged along one edge for insertion of the transparent sheet or any other convenient arrangement for removably holding the sheet in the frame can be provided. Since substantial time may elapse between instances where it is desirable to change the electrically conductive sheet the frame can be bolted together without great inconvenience.

An electrical connector 76 is provided on one edge of the frame so that electrical contact can be made thereto.

When such an apparatus is used the height of the body warming structure over the patient is adjusted by loosening the screw 68 and sliding the mounting block along the vertical leg of the stand. Further the position of the transparent electrically conductive sheet 74 in the frame can be adjusted by loosening the bolts 73 and tilting the frame in the trunnions 71. Clearly other mounting arrangements for the flat frame with a transparent electrically conductive flexible sheet therein can be provided.

Figure 8:
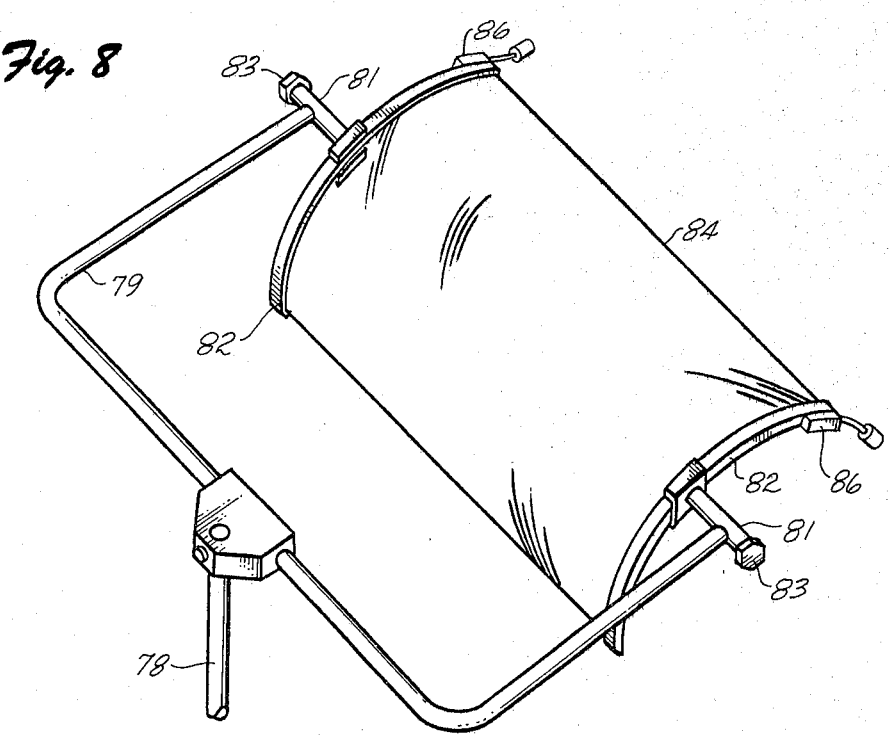
FIG. 8 illustrates still another embodiment of body covering and warming structure.

FIG. 8 illustrates in a view similar to FIG. 7 another embodiment of body warming and covering apparatus wherein the flexible transparent sheet is arched between a pair of supporting members along opposite edges. In this arrangement a floor stand 78 or the like supports a U-shaped bracket 79 in a manner as hereinabove described. Coaxial trunnions 81 are mounted on the ends of the U-shaped bracket so that the body warming structure can be tilted if desired. A rigid curved rail 82 is connected to each trunnion and can be tilted about its axis. The rails 82 can be clamped in place by locking bolts 83 if desired. In many embodiments the rails can be maintained in a fixed position without substantial detriment.

Each of the rails 82 includes means for clamping a flexible transparent electrically conductive sheet 84. The means for clamping may be a simple spring loaded clamp as hereinabove described and illustrated in FIG. 4 or the rail can be made in two pieces which can be separated for releasing a sheet held thereby. A great variety of ways of temporarily and removably securing a transparent flexible conductive sheet between the side rails will be apparent to one skilled in the art. An electrical connector 86 is provided on each rail so that electrical contact can be made to a bus bar (not shown) along the clamped edges of the flexible sheet. Such an arrangement provides means for removably supporting the two arched side edges of the flexible sheet in a fixed position. The other two edges extend between the rails without direct mechanical support.

When a flat frame as illustrated in FIG. 7 is employed the four side edges of the flexible heater are sufficiently contained that neither a patient nor attending person can make contact therewith. In an arrangement as illustrated in FIG. 8 wherein the flexible heater is supported in an arched position between a pair of parallel rails without intermediate support, two of the side edges are exposed. It is desirable to provide an electrical isolation line through the conductive film or to remove the conductive film in the portions adjacent these free edges to completely eliminate any electrical hazard. The same effect can be obtained with a nonconductive coating along the unsupported edges.

Although limited embodiments of transparent, flexible warming structure have been described and illustrated herein, many modifications and variations will be apparent to one skilled in the art. Thus, for example, in using a rigid frame for holding the flexible structure in some embodiments it may be preferred to employ a glass or plastic sheet or the like for supporting the flexible heater sheet throughout its entire extent.

It will also be apparent that because of the relative economy of making the flexible transparent warming structure in a continuous process with large rolls of plastic sheet, the scope of utilization of the transparent warming structure can be significantly increased. Thus, for example, the transparent flexible warming structure can be used in applications where it is desired to keep food or other similar materials warm, or demonstration egg incubators can be made with such material. Economy is such that hot frames and the like for growing seedlings can be provided with transparent covers incorporating heaters to prevent frost damage. Many other applications of a transparent flexible heating structure will be apparent to one skilled in the art. It is therefore to be understood that within the scope of the appended claims the invention may be practiced otherwise than as specifically described.

What is claimed is:

1. A transparent flexible warming structure comprising:
   a first flexible transparent plastic sheet having a pair of side edges;
   an electrically conductive transparent heater layer over substantially all of one side of the sheet;
   a second flexible transparent plastic sheet bonded to the heater layer over substantially all of its area except a portion of a strip along each of the pair of side edges; and
   a high conductivity flexible strip electrically and mechanically bonded to the heater layer along each of the pair of side edges;
   said plastic sheets being selected from synthetic resins that are substantially transparent in the visible spectrum and substantially opaque in bulk in the infrared spectrum, have a heat deformation of less than about 1 percent in any direction at about 150° F, have an elastic modulus in the range of about $1.8 \times 10^5$ to $4.5 \times 10^5$ psi, and are selected from the group consisting of polycarbonate resin, polyimide resin, fluorinated ethylene-propylene resin, polyamide resin, polyester resin, polyacrylic resin and cellulose triacetate resin, at least one of said sheets having a sufficiently low vapor pressure to be vacuum metallizable, the total thickness of the flexible warming structure being up to about 30 mils so as to be readily bent by hand.

2. A transparent flexible warming structure as defined in claim 1 wherein one sheet is relatively thicker than the other sheet.

3. A transparent flexible warming structure as defined in claim 1 wherein the plastic sheets are each selected from the group consisting of polyethylene terephthalate and polyamide resin.

4. A transparent flexible warming structure as defined in claim 1 wherein the plastic sheets are polyethylene terephthalate and wherein one sheet is in the order of about 0.005 inch thick and the other sheet is in the range of from about 0.007 to 0.01 inch thick.

5. A transparent flexible warming structure as defined in claim 1 wherein one of said plastic sheets has a relatively higher stiffness and the other plastic sheet has a relatively lower stiffness.

6. A transparent flexible warming structure as defined in claim 1 wherein both sheets comprise polyethylene terephthalate of substantially equal thickness.

7. A transparent flexible warming structure as defined in claim 1 wherein one of said plastic sheets has a relatively higher infrared emittance and the other plastic sheet has a relatively lower infrared emittance.

8. A transparent flexible warming structure as defined in claim 1 wherein the pair of side edges are substantially equally spaced apart and wherein the heater layer is relatively wider at one portion between the side edges and relatively narrower in another portion between the side edges.

9. A transparent warming structure as defined in claim 8 wherein one of the high conductivity strips is longer than the other of the high conductivity strips.

10. A transparent flexible warming structure as defined in claim 1 wherein the first sheet comprises polyethylene terephthalate in the order of about 0.005 inch thick and the second sheet comprises polyethylene terephthalate in the range of from about 0.007 to 0.01 inch thick.

11. A transparent flexible warming structure comprising:
a first flexible transparent polyethylene terephthalate sheet having a pair of side edges;
an electrically conductive transparent heater layer over substantially all of one side of the sheet;
a second flexible transparent polyethylene terephthalate sheet bonded to the heater layer over substantially all of its area; and
a high conductivity strip electrically and mechanically bonded to the heater layer along each of a pair of its side edges;
said polyethylene terephthalate sheets being substantially transparent in the visible spectrum and substantially opaque in bulk in the infrared spectrum, have a heat deformation of less than about 1 percent in any direction of about 150°F, at least one of said sheets having a sufficiently low vapor pressure to be vacuum metallizable, one of the sheets being in the order of about 0.005 inch thick and the other sheet being in the range of from about 0.007 to 0.01 inch thick, one of the sheets having a relatively higher stiffness and the other sheet having a relatively lower stiffness, and one of the sheets having a relatively higher infrared emittance and the other sheet has a relatively lower infrared emittance.

12. A transparent flexible warming structure comprising:
a first flexible transparent plastic sheet having a pair of side edges;
an electrically conductive transparent heater layer over substantially all of one side of the sheet;
a second flexible transparent plastic sheet bonded to the heater layer over substantially all of its area; and
a high conductivity flexible strip electrically and mechanically bonded to the heater layer along each of a pair of its side edges;
said plastic sheets being selected from synthetic resins that are substantially transparent in the visible spectrum and substantially opaque in bulk in the infrared spectrum, have a heat deformation of less than about 1 percent in any direction at about 150°F, have an elastic modulus in the range of about $1.8 \times 10^5$ to $4.5 \times 10^5$ psi, and are selected from the group consisting of polycarbonate resin, polyimide resin, fluorinated ethylene-propylene resin, polyamide resin, polyester resin, polyacrylic resin and cellulose triacetate resin, at least one of said sheets having a sufficiently low vapor pressure to be vacuum metallizable, the total thickness of the flexible warming structure being up to about 100 mils so as to be readily bent by hand.

13. A transparent flexible warming structure as defined in claim 12 wherein one sheet is relatively thicker than the other sheet.

14. A transparent flexible warming structure as defined in claim 12 wherein the plastic sheets are each selected from the group consisting of polyethylene terephthalate and polyamide resin.

15. A transparent flexible warming structure as defined in claim 12 wherein the plastic sheets are polyethylene terephthalate and wherein one sheet is in the order of about 0.005 inch thick and the other sheet is in the range of from about 0.007 to 0.01 inch thick.

16. A transparent flexible warming structure as defined in claim 12 wherein one of said plastic sheets has a relatively higher stiffness and the other plastic sheet has a relatively lower stiffness.

17. A transparent flexible warming structure as defined in claim 12 wherein both sheets comprise polyethylene terephthalate of substantially equal thickness.

18. A transparent flexible warming structure as defined in claim 12 wherein the pair of side edges are substantially equally spaced apart and wherein the heater layer is relatively wider at one portion between the side edges and relatively narrower in another portion between the side edges.

19. A transparent warming structure as defined in claim 18 wherein one of the high conductivity strips is longer than the other of the high conductivity strips.

20. A transparent warming structure as defined in claim 12 wherein the total thickness is less than about 30 mils.

21. A transparent flexible warming structure comprising:
a first flexible transparent polyethylene terephthalate sheet having a pair of side edges;
an electrically conductive transparent heater layer over substantially all of one side of the sheet;
a second flexible transparent polyethylene terephthalate sheet bonded to the heater layer over substantially all of its area except a portion of a strip along each of the pair of side edges; and
a high conductivity strip electrically and mechanically bonded to the heater layer along each of the pair of side edges;
said polyethylene terephthalate sheets being substantially transparent in the visible spectrum and substantially opaque in bulk in the infrared spectrum, have a heat deformation of less than about 1 percent in any direction of about 150° F, at least one of said sheets having a sufficiently low vapor pressure to be vacuum metallizable, one of the sheets being in the order of about 0.005 inch thick and the other sheet being in the range of from about 0.007 to 0.01 inch thick, one of the sheets having a relatively higher stiffness and the other sheet having a relatively lower stiffness, and one of the sheets having a relatively higher infrared emittance and the other sheet has a relatively lower infrared emittance.

* * * * *